US010996576B2

(12) United States Patent
Sawamoto et al.

(10) Patent No.: US 10,996,576 B2
(45) Date of Patent: May 4, 2021

(54) MAGNETIC CORE MATERIAL FOR ELECTROPHOTOGRAPHIC DEVELOPER, CARRIER FOR ELECTROPHOTOGRAPHIC DEVELOPER, AND DEVELOPER

(71) Applicant: POWDERTECH CO., LTD., Kashiwa-shi, Chiba (JP)

(72) Inventors: Hiroki Sawamoto, Kashiwa (JP); Tetsuya Uemura, Kashiwa (JP)

(73) Assignee: POWDERTECH CO., LTD., Kashiwa-Shi, Chiba (JP)

( * ) Notice: Subject to any disclaimer, the term of this patent is extended or adjusted under 35 U.S.C. 154(b) by 0 days.

(21) Appl. No.: 16/474,497

(22) PCT Filed: Dec. 25, 2017

(86) PCT No.: PCT/JP2017/046425
§ 371 (c)(1),
(2) Date: Jun. 27, 2019

(87) PCT Pub. No.: WO2018/128112
PCT Pub. Date: Jul. 12, 2018

(65) Prior Publication Data

US 2019/0339628 A1 Nov. 7, 2019

(30) Foreign Application Priority Data

Jan. 4, 2017 (JP) ................................ 2017-000285

(51) Int. Cl.
*G03G 9/113* (2006.01)
*G03G 9/107* (2006.01)
(Continued)

(52) U.S. Cl.
CPC ......... *G03G 9/0835* (2013.01); *G03G 9/0837* (2013.01); *G03G 9/1075* (2013.01); *G03G 9/1085* (2020.08); *G03G 9/113* (2013.01)

(58) Field of Classification Search
CPC .. G03G 9/0835; G03G 9/0837; G03G 9/1075; G03G 9/113; G03G 9/08; G03G 9/10; G03G 9/107; G03G 9/1085
See application file for complete search history.

(56) References Cited

U.S. PATENT DOCUMENTS

| | | | |
|---|---|---|---|
| 5,595,850 | A | 1/1997 | Honjo et al. |
| 6,143,456 | A | 11/2000 | Silence et al. |

(Continued)

FOREIGN PATENT DOCUMENTS

| | | | |
|---|---|---|---|
| JP | S5880648 | A | 5/1983 |
| JP | 64038759 | A | 2/1989 |

(Continued)

OTHER PUBLICATIONS

English language machine translation of WO 2018-110562. (Year: 2018).*

(Continued)

*Primary Examiner* — Christopher D Rodee
(74) *Attorney, Agent, or Firm* — Procopio, Cory, Hargreaves & Savitch LLP

(57) ABSTRACT

Provided are a magnetic core material for electrophotographic developer and a carrier for electrophotographic developer, which are excellent in charge characteristics and strength and with which a satisfactory image free from defects can be obtained, and a developer containing the carrier.

A magnetic core material for electrophotographic developer, having a sulfur component content of from 50 to 700 ppm in terms of a sulfate ion and a BET specific surface area of from 0.06 to 0.25 $m^2/g$.

5 Claims, 1 Drawing Sheet

(51) Int. Cl.

| | |
|---|---|
| ***G03G 9/10*** | (2006.01) |
| ***G03G 9/083*** | (2006.01) |

(56) References Cited

U.S. PATENT DOCUMENTS

| | | | | |
|---|---|---|---|---|
| 2002/0119386 | A1 | 8/2002 | Meisen | |
| 2006/0003248 | A1 | 1/2006 | Kobayashi et al. | |
| 2009/0246526 | A1 | 10/2009 | Sugiura et al. | |
| 2010/0055601 | A1 | 3/2010 | Sugiura et al. | |
| 2011/0212399 | A1 | 9/2011 | Suwa et al. | |
| 2011/0244389 | A1 * | 10/2011 | Kojima | G03G 9/107 430/111.1 |
| 2014/0065535 | A1 | 3/2014 | Kinoshita et al. | |
| 2019/0337818 | A1 * | 11/2019 | Aga | C01G 49/06 |

FOREIGN PATENT DOCUMENTS

| | | | | |
|---|---|---|---|---|
| JP | H08-022150 | A | 1/1996 | |
| JP | 2006-017828 | A | 1/2006 | |
| JP | 2009-234839 | A | 10/2009 | |
| JP | 2010-055014 | A | 3/2010 | |
| JP | 2011-180296 | A | 9/2011 | |
| JP | 2011-227452 | A | 11/2011 | |
| JP | 2012-181393 | A | 9/2012 | |
| JP | 2012-181398 | A | 9/2012 | |
| JP | 2012230373 | A | 11/2012 | |
| JP | 2016-025288 | A | 2/2016 | |
| JP | 6319779 | B | 4/2018 | |
| WO | WO-2018110562 | A1 * | 6/2018 | F16D 69/027 |
| WO | WO-2018110563 | A1 * | 6/2018 | F16D 69/026 |

OTHER PUBLICATIONS

English language machine translation of WO 2018-110563. (Year: 2018).*

International Search Report and Written Opinion for related International Application No. PCT/JP2017/046425 dated Feb. 13, 2018; English translation of ISR provided; 9 pages.

Extended European Search Report for related EP App. No. 17890273.0 dated Jun. 22, 2020; 7 pages.

Office Action for related JP App. No. 2017-000285 dated Jul. 14, 2020. English translation provided; 8 pages.

Submission of Publication for JP2017-000285 dated Aug. 4, 2020. English translation provided. Total 28 pages.

H. Saita, et al, "Effect of Sulphate Ion on Grain Boundary Chemistry in MnZn Ferrite", Journal of Magnetics Society of Japan, 24, 719-722, 2000, Total 4 pages.

N. Ichinose, "Historical Development of Ferrite Technologies", National Museum of Nature and Science, Survey Report on Historical Development of Technologies, vol. 13, P186, May 29, 2009. English translation provided. Total 8 pages.

* cited by examiner

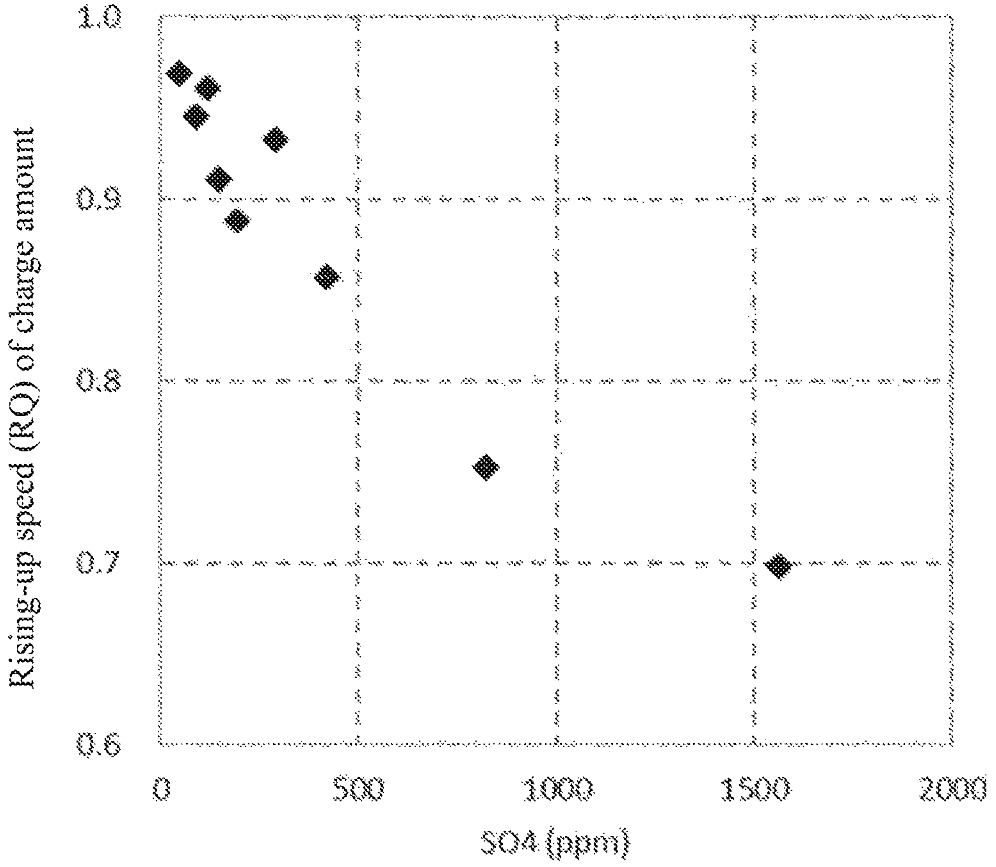
1.0
0.9
0.8
0.7
0.6
Rising-up speed (RQ) of charge amount
0
500
1000
1500
2000
SO4 (ppm)

MAGNETIC CORE MATERIAL FOR ELECTROPHOTOGRAPHIC DEVELOPER, CARRIER FOR ELECTROPHOTOGRAPHIC DEVELOPER, AND DEVELOPER

CROSS-REFERENCE TO RELATED APPLICATIONS

This application is a U.S. National Stage entry of PCT Application No: PCT/JP2017/046425 filed on Dec. 25, 2017, which claims priority to Japanese Patent Application No. 2017-000285, filed Jan. 4, 2017, the contents of which are incorporated herein by reference.

TECHNICAL FIELD

The present invention relates to a magnetic core material for electrophotographic developer, a carrier for electrophotographic developer, and a developer.

BACKGROUND ART

The electrophotographic development method is a method in which toner particles in a developer are made to adhere to electrostatic latent images formed on a photoreceptor develop the images. The developer used in this method is classified into a two-component developer composed of a toner particle and a carrier particle, and a one-component developer using only a toner particle.

As a development method using the two-component developer composed of a toner particle and a carrier particle among those developers, a cascade method and the like were formerly employed, but a magnetic brush method using a magnet roll is now in the mainstream. In the two-component developer, a carrier particle is a carrier substance which is agitated with a toner particle in a development box filled with the developer to impart a desired charge to the toner particle, and further transports the charged toner particle to a surface of a photoreceptor to form toner images on the photoreceptor. The carrier particle remaining on a development roll to hold a magnet is again returned from the development roll to the development box, mixed and agitated with a fresh toner particle, and used repeatedly in a certain period.

In the two-component developer, unlike a one-component developer, the carrier particle has functions of being mixed and agitated with a toner particle to charge the toner particle and transporting the toner particle to a surface of a photoreceptor, and it has good controllability on designing a developer. Therefore, the two-component developer is suitable for using in a full-color development apparatus requiring a high image quality, a high-speed printing apparatus requiring reliability for maintaining image and durability, and the like. In the two-component developer thus used, it is needed that image characteristics such as image density, fogging, white spots, gradation, and resolving power exhibit predetermined values from the initial stage, and additionally these characteristics do not vary and are stably maintained during the durable printing period (i.e., a long period of time of use). In order to stably maintain these characteristics, characteristics of a carrier particle contained in the two-component developer need to be stable. As a carrier particle forming the two-component developer, various carrier such as an iron powder carrier, a ferrite carrier, a resin-coated ferrite carrier, and a magnetic powder-dispersed resin carrier have conventionally been used.

Recently, networking of offices progresses, and the time changes from a single-function copying machine to a multifunctional machine. In addition, a service system also shifts from a system where a service person who contracts to carry out regular maintenance and to replace a developer or the like to the time of a maintenance-free system. The demand for further extending the life of the developer from the market is increasing more and more.

There are some literatures focusing on such a demand. For example, Patent Literature 1 (JP-A-H08-22150) proposes a ferrite carrier for electrophotographic developer, characterized in that MnO, MgO, and $Fe_2O_3$ are partially substituted with SrO, and also describes that according to this ferrite carrier, since variation in magnetization between the ferrite carrier particles is reduced, effects including excellent image quality and durability, environment-friendliness, prolonged lifetime, and excellent environmental stability can be achieved. In addition, Patent Literature 2 (JP-A-2006-17828) proposes a ferrite carrier for electrophotographic developer, characterized by containing from 40 to 500 ppm of zirconium, and also describes that according to this ferrite carrier, occurrence of charge leakage can be prevented due to the high dielectric breakdown voltage thereof, and as a result, high image quality can be obtained.

On the one hand, as such, it has been known that the carrier properties are greatly improved by adding specific additive elements to a ferrite composition, but on the other hand, it has also been known that the carrier characteristics can also be greatly reduced by a trace amount of elements. For example, Patent Literature 3 (JP-A-2011-180296) proposes a carrier core material for electrophotographic developer which is a ferrite core material in which MnO and/or MgO is partially substituted with SrO, characterized in that the Cl concentration of the ferrite core material measured by elution method is from 0.1 to 100 ppm. It is also described that according to this carrier core material, a desired high charge amount can be achieved and an effect of small change in charge amount due to environmental changes can be obtained.

Patent Literature 4 (JP-A-2016-25288) proposes a ferrite magnetic material which includes main components containing Fe and additive elements such as Mn and has an average particle size of from 1 to 100 μm, in which a total amount of impurities excluding Fe, additive elements, and oxygen in the ferrite magnetic material is 0.5 mass % or less, and the impurities include at least two or more of Si, Al, Cr, Cu, P, Cl, Ni, Mo, Zn, Ti, sulfur, Ca, Mn, and Sr. It is described that a magnetic carrier using, as a magnetic carrier core material for electrophotographic developer, the ferrite magnetic material in which the influence of the impurities in the raw material is suppressed, has a high magnetic force and exhibits an effect of suppressing carrier scattering.

CITATION LIST

Patent Literature

Patent Literature 1: JP-A-H08-22150

Patent Literature 2: JP-A-2006-17828

Patent Literature 3: JP-A-2011-180296

Patent Literature 4: JP-A-2016-25288

SUMMARY OF INVENTION

As such, on the one hand, attempts to improve the carrier characteristics by adding specific additive elements to the carrier core material or by suppressing the contents of trace elements have been known; but on the other hand, further improvement of the carrier characteristics, specifically charge imparting ability and durability of the carrier, has been desired in response to the demands for high image quality and higher-speed printing. In particular, in order to stably maintain image characteristics under all sorts of printing conditions, it is desired for the carrier to have high rising-up speed of charge amount. This is because if the rising-up speed of charge amount of the carrier is low, the charge amount does not rise quickly after replenishing toner and thus, toner scattering or image defects such as fogging, are generated. Furthermore, in order for the carrier to have excellent durability, it is desired for the carrier to have high compression breaking strength and to have a small variation between particles, that is, small variation coefficient of the compression breaking strength. This is because if the compression breaking strength of the carrier is low or the variation coefficient is large, the proportion occupied by particles with small strength is increased, and the number of carriers crushed during durable printing period is increased. Carriers crushed due to agitation stress during durable printing period or mechanical stress such as collision of particles with each other, impact, friction, or stress occurred between particles in a development box, adhere to the photoreceptor, which leads to a cause of image defects. In improving the carrier characteristics, the carrier core material characteristics itself are important, and thus improving the charge characteristics and strength of the carrier core material is desired.

As iron oxide that is a raw material of ferrite used in a carrier core material, iron oxide by-produced in a hydrochloric acid pickling step of steel production is generally used, and this iron oxide contains a sulfur component as impurities. However, since the sulfur component has a small inhibition effect on sintering of ferrite and a small corrosion to production equipment, and there exists a reciprocal relationship in that increase in the quality of raw material leads to decrease in economic efficiency, it has been conventionally considered that the sulfur component is not an important quality index of iron oxide.

Now, the present inventors have found that in the magnetic core material for electrophotographic developer, the content of sulfur components and the BET specific surface area are important in an effort for improving charging characteristics and strength. Specifically, they have found that by suitably controlling the sulfur component content in the magnetic core material for electrophotographic developer and the BET specific surface area, the rising-up of charge amount can be improved and at the same time, the compression breaking strength can be increased and the fluctuation thereof (variation of the compression breaking strength of the individual particles of the magnetic core material) can be reduced, and thus a satisfactory image can stably be obtained when being used for a carrier or a developer.

Therefore, an object of the present invention is to provide a magnetic core material for electrophotographic developer which is excellent in rising-up of charge amount, has high compression breaking strength with low fluctuation thereof, and is capable of providing a satisfactory image stably when being used for a carrier or a developer. Furthermore, another object of the present invention is to provide a carrier for electrophotographic developer and a developer including such a magnetic core material.

According to an aspect of the present invention, there is provided a magnetic core material for electrophotographic developer, having a sulfur component content of from 50 to 700 ppm in terms of a sulfate ion and a BET specific surface area of from 0.06 to 0.25 $m^2/g$.

According to another aspect of the present invention, there is provided a carrier for electrophotographic developer including the magnetic core material for electrophotographic developer and a coating layer made of a resin provided on a surface of the magnetic core material.

According to still another aspect of the present invention, there is provided a developer including the carrier and a toner.

BRIEF DESCRIPTION OF DRAWINGS

FIG. 1 It shows a relationship between a sulfur component content and rising-up of charge amount in a magnetic core material.

DESCRIPTION OF EMBODIMENTS

In the specification, a numerical value range represented by using "to" means a range including numerical values given before and after "to" as a lower limit value and an upper limit value, respectively.

A magnetic core material for electrophotographic developer is a particle usable as a carrier core material, and becomes a magnetic carrier for electrophotographic developer after a resin is coated on the carrier core material. An electrophotographic developer is obtained by including the magnetic carrier for electrophotographic developer and a toner.

Magnetic Core Material for Electrophotographic Developer:

The magnetic core material for a developer for electrophotography (hereinafter, also referred to as "magnetic core material" or "carrier core material" in some cases) of the present invention has a feature that the content of a sulfur component is controlled within a specific range. Specifically, the content of the sulfur component is from 50 to 700 ppm in terms of sulfur ion ($SO_4^{2-}$) in the magnetic core material. According to such a magnetic core material, a carrier having excellent charge imparting ability and strength can be obtained. In the case where the sulfur component content is more than 700 ppm, the rising-up speed of charge amount becomes low. It is considered that this is because the sulfur component easily absorbs moisture, the moisture content in the magnetic core material and carrier increases to decrease the charge imparting ability, and at the time of stirring the carrier and the toner in developer, the sulfur component in the carrier transfers to the toner, thereby lowering the charging ability of the toner. On the other hand, in the case where the sulfur component content is less than 50 ppm, the fluctuation of the compression breaking strength becomes large and the durability of the carrier becomes inferior. It is considered that this is probably because if the sulfur component in the magnetic core material is too small, the effect of inhibiting sintering becomes too small, and the crystal growth rate becomes excessively large during sintering step at the time of producing the magnetic core material. It is presumed that if the crystal growth rate is excessively high, the degree of sintering varies among the particles as compared with the case where the crystal growth rate is appropriate even if the sintering conditions are adjusted, and as a result, particles (magnetic core material) having low strength are produced more frequently. In the case where particles of low strength are used as carriers, breakage cracks due to mechanical stress received in the developing machine during durable printing occur, and image defects are caused by a change in electrical characteristics. In addition, in order to produce a magnetic core material having a sulfur component content of less than 50 ppm, it is necessary to use a raw material having high quality (low content of a sulfur component) or to pass through a step for increasing the quality and thus, there is a problem of poor productivity. The sulfur component content is preferably from 80 to 500 ppm, and particularly preferably from 100 to 400 ppm on a mass basis.

The content of sulfur components in the magnetic core material is obtained in terms of a sulfate ion. This does not mean that the sulfur components are limited to that contained in the form of a sulfate ion, and the sulfur components may be contained in the form of elemental sulfur, a metal sulfide, a sulfate ion, other sulfides or the like. The content of sulfur components can be measured by, for example, a combustion ion chromatography method. The combustion ion chromatography method is a technique in which a sample is burned in oxygen-containing gas flow, the gas generated is absorbed in an adsorption solution and then, a halogen or a sulfate ion adsorbed in the adsorption solution is quantitatively analyzed by an ion chromatography method. The technique makes it possible to easily analyze a halogen or sulfur component in ppm order which has been conventionally difficult.

The value of the content of sulfur components in terms of a sulfate ion described in the specification is a value measured by the combustion ion chromatography method under the conditions described in Examples described later.

In addition, the magnetic core material of the present invention has a BET specific surface area of from 0.06 to 0.25 $m^2/g$. In the case where the BET specific surface area is less than 0.06 $m^2/g$, the effective charging area becomes small such that the charge imparting ability decreases. In the case where it exceeds 0.25 $m^2/g$, the compression breaking strength decreases. The BET specific surface area is preferably from 0.08 to 0.22 $m^2/g$, and more preferably from 0.10 to 0.20 $m^2/g$.

The value of the BET specific surface area described in the present specification is a value measured using a BET specific surface area measuring apparatus under the conditions described in Examples described later.

The BET specific surface area of the magnetic core material can be set within the above-mentioned range by adjusting the volume average particle diameter at the time of pulverizing a calcined product or the sintering temperature at the time of sintering.

For example, by decreasing the volume average particle size of the calcined product, the BET specific surface area becomes large, and by increasing the volume average particle diameter, the BET specific surface area becomes small. Furthermore, as the temperature at the time of sintering increases, the BET specific surface area tends to decrease, and as the temperature at the time of the sintering decreases, the BET specific surface area tends to increase.

In order to set the BET specific surface area within the above range, the volume average particle diameter of the calcined product is preferably set to 3 μm or less, and more preferably 2 μm or less in $D_{50}$. The sintering temperature is preferably from 1,130° C. to 1,280° C., and more preferably 1,150° C. to 1,250° C.

As to the magnetic core material, as long as it functions as a carrier core material, the composition thereof is not particularly limited and one having a conventionally known composition may be used. The magnetic core material typically has a ferrite composition (ferrite particle) and preferably has a ferrite composition containing Fe, Mn, Mg, and Sr. On the other hand, in consideration of the recent trend of the environmental load reduction including the waste regulation, it is desirable that heavy metals such as Cu, Zn and Ni are not contained in a content exceeding inevitable impurities (associated impurities) range.

Particularly preferably, the magnetic core material is one having a composition represented by the formula: $(MnO)_x(MgO)_y(Fe_2O_3)_z$ in which MnO and MgO are partially substituted with SrO. Here, x=35 to 45 mol %, y=5 to 15 mol %, z=40 to 60 mol %, and x+y+z=100 mol %. By setting x to 35 mol % or more and y to 15 mol % or less, magnetization of ferrite is increased and carrier scattering is further suppressed. On the other hand, by setting x to 45 mol % or less and y to 5 mol % or more, a magnetic core having a higher charge amount can be obtained.

This magnetic core material contains SrO in its composition. Inclusion of SrO suppresses generation of low magnetization particles. In addition, together with $Fe_2O_3$. SrO forms a magnetoplumbite ferrite in a form of $(SrO).6(Fe_2O_3)$ or a precursor of a strontium ferrite (hereinafter referred to as an Sr—Fe compound), which is a cubical crystal as represented by $Sr_aFe_bO_c$ (here, a≥2, a+b≤c≤a+1.5b) and has a perovskite crystal structure, and forms a complex oxide solid-solved in $(MnO)_x(MgO)_y(Fe_2O_3)_z$ in a spinel structure. This complex oxide of iron and strontium has an effect of improving the charge imparting ability of the magnetic core material in mainly cooperation with magnesium ferrite which is a component containing MgO. In particular, the Sr—Fe compound has a crystal structure similar to that of $SrTiO_3$, which has a high dielectric constant, and thus contributes to high charging capacity of the magnetic core material. The substitution amount of SrO is preferably from 0.1 to 2.5 mol %, more preferably 0.1 to 2.0 mol %, and even more preferably 0.3 to 1.5 mol %, based on the total amount of $(MnO)_x(MgO)_y(Fe_2O_3)_z$. By setting the substitution amount of SrO to 0.1 mol % or more, the effect of containing SrO is further exerted. By setting to 2.5 mol % or less, excessive increases in remanent magnetization and coercive force are suppressed, and as a result, the carrier fluidity becomes better.

The volume average particle diameter ($D_{50}$) of the magnetic core material is preferably from 20 to 50 μm. By setting the volume average particle diameter to 20 μm or more, carrier scattering is further suppressed. On the other hand, by setting to 50 μm or less, the image quality is further improved. The volume average particle size is more preferably from 25 to 45 μm, and more preferably from 30 to 40 μm.

The apparent density (AD) of the magnetic core material is preferably from 1.5 to 2.5 $g/cm^3$. By setting the apparent density to 1.5 $g/cm^3$ or more, the fluidity of the carrier is improved. On the other hand, by setting to 2.5 $g/cm^3$ or less, the deterioration of charging characteristics caused by agitation stress in a developing machine is further suppressed. The apparent density is more preferably from 1.7 to 2.4 $g/cm^3$, and even more preferably from 2.0 to 2.3 $g/cm^3$.

The pore volume of the magnetic core material is preferably 25 $mm^3/g$ or less. By setting the pore volume to 25 $mm^3/g$ or less, since moisture adsorption in the atmosphere is suppressed, the change in charge amount due to environmental variation is reduced, and since impregnation of resin into the core material during resin coating is suppressed, it is not necessary to use a large amount of resin. The pore volume is more preferably from 0.1 to 20 $mm^3/g$, and more preferably from 1 to 20 $mm^3/g$.

The pore volume value described in the present specification is a value measured and calculated under the conditions described in Examples described later using a mercury porosimeter.

The charge amount of the magnetic core material is preferably 5 μC/g or more, more preferably 10 μC/g or more, and even more preferably 15 μC/g or more. By setting the charge amount to 5 μC/g or more, the charge imparting ability of the carrier can be further enhanced.

As to the magnetic core material, the rising-up speed of charge amount is preferably 0.80 or more, more preferably 0.85 or more and further preferably 0.90 or more. In the case where the rising-up speed of charge amount of the magnetic core material is 0.80 or more, the charge of carrier also rises rapidly and as a result, in the case of forming a developer together with a toner, at an initial stage after toner replenishment, toner scattering and image defects such as fogging are further suppressed.

The charge amount (Q) and the rising-up speed (RQ) thereof can be measured, for example, in the following manner. Namely, a sample and a commercially available negatively chargeable toner (cyan toner, manufactured by Fuji Xerox Co., Ltd., for DocuPrint C3530) used in full-color printer are weighed so as to attain the toner concentration of 8.0% by weight and the total weight of 50 g. The sample and toner weighed are exposed under a normal temperature and normal humidity environment of temperature from 20 to 25° C. and relative humidity from 50 to 60% for 12 hours or more. Then, the sample and toner are charged into a 50-cc glass bottle and agitated at a rotation frequency of 100 rpm for 30 minutes to form a developer. On the other hand, as a charge amount measuring apparatus, use is made of an apparatus having a magnet roll including a total 8 poles of magnets (magnetic flux density: 0.1 T) which N poles and S poles are alternately arranged on an inner side of an aluminum bare tube (hereinafter, a sleeve) of a cylindrical shape of 31 mm in diameter and 76 mm in length, and a cylindrical electrode arranged in an outer circumference of the sleeve with a gap of 5.0 mm from the sleeve. On the sleeve is uniformly adhered 0.5 g of the developer and then, while the magnet roll on the inner side is rotated at 100 rpm with the outer-side aluminum bare tube being fixed, a direct current voltage of 2,000 V is applied for 60 seconds between the outer electrode and the sleeve to transfer the toner to the outer-side electrode. At this time, an electrometer (insulation resistance tester, model 6517A, manufactured by Keithley Instruments, Inc.) is connected to the cylindrical electrode to measure the charge amount of the toner transferred. After the elapse of 60 seconds, the voltage applied is shut off, and after the rotation of the magnet roll is stopped, the outer-side electrode is taken out and the weight of the toner transferred to the electrode is measured. From the charge amount measured and the weight of the toner transferred, the charge amount ($Q_{30}$) is calculated. In addition, the charge amount ($Q_2$) is obtained in the same procedure as in the charge amount ($Q_{30}$) except for changing the agitation time of the sample and the toner to 2 minutes. The rising-up speed of charge amount (RQ) is determined from the formula shown below. As the numeric value is close to 1, it means that the rising-up speed of charge amount is high.

$$RQ=Q_2/Q_{30} \quad \text{[Math. 1]}$$

The average of compression breaking strength (average compression breaking strength) of the magnetic core material is preferably 200 mN or more, more preferably 230 mN or more, and even more preferably 260 mN or more. The average of compression breaking strength refers to the average of compression breaking strengths of the individual particles in a particle assembly of the magnetic core material. By setting the average compression breaking strength to 200 mN or more, the strength as a carrier is increased, and thus the durability is further improved. Although the upper limit of the average compression breaking strength is not particularly limited, it is typically 450 mN or less.

The variation coefficient of compression breaking strength (compression breaking strength variation coefficient) of the magnetic core material is preferably 40% or less, more preferably 37% or less, and even more preferably 34% or less. The compression breaking strength variation coefficient is an index of the variation of the compression breaking strength of individual particles in a particle assembly of the magnetic core material, and can be obtained by a method described later. By setting the variation coefficient of the compression breaking strength to 40% or less, the proportion occupied by particles with low strength can be lowered, and the strength as a carrier can be increased. Although the lower limit of the compression breaking strength variation coefficient is not particularly limited, it is typically 5% or more.

The average compression breaking strength ($CS_{ave}$) and the compression breaking strength variation coefficient ($CS_{var}$) can be measured, for example, as follows. That is, an ultra-small indentation hardness tester (ENT-1100a, produced by Elionix Co., Ltd.) is used for measuring the compression breaking strength. A sample dispersed on a glass plate is set in the tester and subjected to measurement under an environment of 25° C. For the test, a flat indenter with a diameter of 50 μmϕ is used and loaded up to 490 mN at a load speed of 49 mN/s. As a particle to be used for measurement, a particle which is singly present on the measurement screen (lateral 130 μm×length 100 μm) of the ultra-micro indentation hardness tester, has a spherical shape, and of which an average value of a major axis and a minor axis when measured by software attached to ENT-1100a is volume average particle diameter ±2 μm is selected. It is presumed that the particle has broken down when the slope of the load-displacement curve approaches 0, and the load at the inflection point is taken as the compression breaking strength. The compression breaking strengths of 100 particles are measured and the compression breaking strengths of 80 pieces excluding those of 10 particles from each of the maximum value and the minimum value are employed as data to obtain the average compression breaking strength ($CS_{ave}$). Furthermore, the compression breaking strength variation coefficient ($CS_{var}$) is calculated from the following formula by calculating the standard deviation ($CS_{sd}$) for the 80 particles above.

$$CS_{var}(\%)=(CS_{sd}/CS_{ave})\times 100 \quad \text{[Math. 2]}$$

As described above, the magnetic core material (carrier core material) for electrophotographic developer according to the present invention aims to improve charging characteristics and durability, and in which the content of the sulfur component is controlled to be from 50 to 700 ppm in terms of a sulfate ion and the BET specific surface area is controlled to be from 0.06 to 0.25 $m^2/g$. This makes it possible to obtain a carrier which is excellent in charge imparting ability and rising-up of charge amount, is excellent in strength, and has suppressed strength deviation, and with which a satisfactory image free of defects can be obtained.

To the present inventor's knowledge, techniques for controlling the sulfur component content and the BET specific surface area as such have not heretofore been known.

For example. Patent Literatures 3 and 4 focus attention on impurities in the carrier core material, but Patent Literature 3 specifies the Cl concentration for the purpose of achieving a high charge amount and suppressing environmental variation of the charge amount without mentioning the sulfur component at all.

In addition, Patent Literature 4 aims at suppressing carrier scattering and achieves excellent magnetic properties and suppression of carrier scattering by specifying the total amount of impurities in the ferrite magnetic material. Patent Literature 4 focuses on merely minimizing the total amount of impurities as much as possible, does not teach controlling the content of sulfur component to fall within a specific range and does not disclose the BET specific surface area thereof as well.

As such, the present invention and Patent Literatures 3 and 4 differ not only in the objects but also in the effects.

Carrier for Electrophotographic Developer

The carrier for electrophotographic developer (also simply referred to as carrier in some cases) of the present invention is desirably obtained by surface-coating the surface of the magnetic core material (carrier core material) with a coating resin. Carrier characteristics may be affected by materials present on the carrier surface and properties thereof. Therefore, by surface-coating with an appropriate resin, desired carrier characteristics can precisely be imparted.

The coating resin is not particularly limited. Examples thereof include a fluorine resin, an acrylic resin, an epoxy resin, a polyamide resin, a polyamide imide resin, a polyester resin, an unsaturated polyester resin, a urea resin, a melamine resin, an alkyd resin, a phenol resin, a fluoroacrylic resin, an acryl-styrene resin, a silicone resin, and a modified silicone resin modified with a resin such as an acrylic resin, a polyester resin, an epoxy resin, a polyamide resin, a polyamide imide resin, an alkyd resin, a urethane resin, or a fluorine resin, and the like. In consideration of elimination of the resin due to the mechanical stress during usage, a thermosetting resin is preferably used. Specific examples of the thermosetting resin includes an epoxy resin, a phenol resin, a silicone resin, an unsaturated polyester resin, a urea resin, a melamine resin, an alkyd resin, resins containing them, and the like. The coating amount of the resin is preferably from 0.5 to 5.0 parts by weight with respect to 100 parts by weight of the magnetic core material (before resin coating).

Furthermore, a charge control agent may be incorporated into the coating resin. Examples of the charge control agent include various types of charge control agents commonly used for toner, and various types of silane coupling agents. The kinds of the charge control agents and coupling agents usable are not particularly limited, and preferred are a charge control agent such as a nigrosine dye, a quaternary ammonium salt, an organic metal complex, or a metal-containing monoazo dye, an aminosilane coupling agent, a fluorine-based silane coupling agent, and the like.

A toner having a negative polarity has become mainstream recently and thus, a carrier having a positive polarity is required. Examples of a material having a strong positive polarity include amine compounds. The amine compounds have a strong positive polarity and are capable of making the toner sufficiently negative, and thus considered to be an effective material. There are various compounds that may be used as such an amine compound. Examples thereof include aminosilane coupling agents, amino-modified silicone oils, and quaternary ammonium salts. Among such amine compounds, aminosilane coupling agents are particularly preferred.

As the aminosilane coupling agent, any of a primary amine, a secondary amine, or a compound containing both of them can be used. Examples thereof that may be suitably used include N-2(aminoethyl)3-aminopropylmethyldimethoxysilane, N-2(aminoethyl)3-aminopropyltrimethoxysilane, N-2(aminoethyl)3-aminopropyltriethoxysilane, N-aminopropyltrimethoxysilane, N-aminopropyltriethoxysilane, 3-triethoxysilyl-N-(1,3-dimethyl-butylidene)propylamine, and N-phenyl-3-aminopropyltrimethoxysilane.

In the case where the amine compound is used in a mixture with a resin, it is desirably contained in the coating resin solid content in an amount of 2 to 50% by weight. In the case where the amine compound content is less than 2% by weight, inclusion effect is not exhibited, and even if it is contained in an amount exceeding 50% by weight, a further improved inclusion effect cannot be obtained, which is economically disadvantageous. Furthermore, in the case where the amount of the amine compound is too large, problems may occur in the compatibility with the coating resin, which is not preferable because a nonhomogeneous resin mixture is likely to be formed.

Other than the use where the amine compound is added to the coating resin which acts as the base, as described above, an amino group may also be modified in the base resin in advance. Examples of such include amino-modified silicone resins, amino group-containing acrylic resins, and amino group-containing epoxy resins. These resins may be used singly or in mixture with other resins. In the case of using the amino group-modified resin or a mixture of the amino group-modified resin with another resin, the amount of the amino group present in the entire resin is appropriately determined according to the charging ability compatibility or the like thereof.

For the purpose of controlling the carrier properties, a conductive agent may be added to the coating resin in addition to the charge control agent. The addition amount thereof is from 0.25 to 20.0% by weight, preferably 0.5 to 15.0% by weight, and particularly preferably 1.0 to 10.0% by weight with respect to the solid content of the coating resin. Examples of the conductive agents include conductive carbon, oxides such as tin oxide and titanium oxide, and various organic conductive agents.

Methods for Producing Magnetic Core Material for Electrophotographic Developer and Carrier for Electrophotographic Developer:

In producing a carrier for electrophotographic developer of the present invention, first, a magnetic core material for electrophotographic developer is produced. For producing the magnetic core material, raw materials are weighed in appropriate amounts, and then pulverized and mixed by a ball mill, a vibration mill or the like for 0.5 hours or more, preferably from 1 to 20 hours. The raw materials are not particularly limited, but desirably selected so as to achieve a composition containing the above-described elements.

The pulverized product thus obtained is pelletized by using a pressure molding machine or the like and then calcined at a temperature of from 700 to 1,300° C. Granulation may be carried out without using the pressure molding machine, but by adding water after pulverizing to form a slurry and using a spray dryer. After the calcining, the mixture is further pulverized with a ball mill, a vibration mill or the like, and then water and, if necessary, a dispersant, a binder and the like are added thereto, and after the viscosity is adjusted, granulation is carried out by granulating in a spray dryer. In pulverizing after calcining, water may be added and pulverization may be carried out with a wet ball mill, a wet vibration mill or the like.

The pulverizer such as the above-mentioned ball mill and vibration mill is not particularly limited, but in order to effectively and evenly disperse the raw materials, using fine beads having a particle size of 1 mm or less as the medium to be used is preferable. The degree of pulverization can be controlled by adjusting the particle size of the beads to be used, composition, and pulverizing time.

Thereafter, the obtained granulated product is held at a temperature of from 800 to 1,500° C. for from 1 to 24 hours in an atmosphere in which oxygen concentration is controlled, to thereby carry out sintering. At that time, a rotary electric furnace, a batch electric furnace, a continuous electric furnace, or the like may be used, and oxygen concentration of the atmosphere during sintering may be controlled by blowing an inert gas such as nitrogen or a reducing gas such as hydrogen or carbon monoxide thereinto.

The sintered product thus-obtained is disaggregated and classified. As the classification method, the existing method such as an air classification method, a mesh filtration method or a precipitation method is used to regulate the particle size to an intended particle size.

Thereafter, if desired, an oxide film treatment can be performed by applying low temperature heating to the surface, thereby regulating the electric resistance. The oxide film treatment can be performed by heat treatment, for example, at 300 to 700° C. (by using a common rotary electric furnace, batch electric furnace or the like. The thickness of the oxide film formed by the treatment is preferably from 0.1 nm to 5 μm. In the case of 0.1 nm or more, the effect of the oxide film layer can be sufficient. In the case of 5 μm or less, decrease in the magnetization or the excessively high resistance is suppressed. If desired, reduction may be performed before the oxide film treatment. As described above, the magnetic core material is prepared As the method for adjusting the content of the sulfur component in a magnetic core material, various techniques can be mentioned. Examples thereof include using a raw material having a small sulfur component, and performing washing operation in the stage of slurry (suspension containing the calcined product and water) before granulation. In addition, it is also effective to increase a flow rate of atmospheric gas introduced into a furnace at the time of calcination or sintering to make the sulfur component be easily discharged outside the system. In particular, the washing operation of slurry is preferably performed, and this can be performed, for example, by a technique in which after dehydration of the slurry, water is added again and wet pulverization is performed. In order to reduce the content of the sulfur component in the magnetic core material, the dehydration and re-pulverization may be repeated.

As described above, it is desired that after the production of the magnetic core material the surface of the magnetic core material is coated with a resin to from a carrier. The coating resin used is that described above. In many cases, carrier characteristics are affected by materials present on the carrier surface and properties thereof. Therefore, by surface-coating with an appropriate resin, desired carrier characteristics can precisely be adjusted. As a coating method, coating can be performed by a known method, for example, a brush coating method, a dry method, a spray dry system using a fluidized bed, a rotary dry system, or a dip-and-dry method using a universal agitator. In order to improve the surface coverage, the method using a fluidized bed is preferred. In the case where the resin is heated after the coating, any of an external heating system and an internal heating system may be employed, and, for example, a fixed or fluidized electric furnace, a rotary electric furnace or a burner furnace can be used. Alternatively, the heating with a microwave may be used. In the case where a UV curable resin is used as the coating resin, a UV heater is employed. The temperature for heating is varied depending on the resin used, but it is necessary to be a temperature equal to or higher than the melting point or the glass transition point. For a thermosetting resin, a condensation-crosslinking resin or the like, the temperature is necessarily raised to a temperature at which the curing sufficiently progresses.

Developer

The developer according to the present invention contains the carrier for electrophotographic developer described above and a toner. The particulate toner (toner particle) constituting the developer includes a pulverized toner particle produced by a pulverizing method and a polymerized toner particle produced by a polymerization method. The toner particle used in the present invention may be toner particles obtained by any method.

The pulverized toner particles can be obtained, for example, by thoroughly mixing a binder resin, a charge control agent and a coloring agent with a mixer such as a Henschel mixer, subsequently, melt-kneading in a twin-screw extruder or the like, then, cooling, pulverizing, classifying, adding external additives such as silica powder and titania, and then mixing with a mixer or the like.

The binder resin constituting the pulverized toner particles is not particularly limited. Examples thereof include polystyrene, chloropolystyrene, styrene-chlorostyrene copolymer, styrene-acrylate ester copolymer, and styrene-methacrylate copolymer, as well as rosin-modified maleic acid resin, epoxy resin, polyester resin, polyurethane resin and the like. They may be used alone or in combination.

As the charge control agent, any agent can be used. For example, for positively chargeable toners, nigrosine dyes, quaternary ammonium salts and the like can be mentioned, and for negatively chargeable toners, metal-containing monoazo dyes and the like can be mentioned.

As the coloring agent (colorant), conventionally known dyes and pigments can be used. For example, use can be made of carbon black, phthalocyanine blue, permanent red, chrome yellow, phthalocyanine green, and the like. In addition, external additives such as silica powder, titania and the like for improving fluidity and cohesion resistance of the toner may be added according to the toner particles.

Polymerized toner particles are toner particles produced by known methods such as a suspension polymerization method, an emulsion polymerization method, an emulsion aggregation method, an ester elongation polymerization method, and a phase inversion emulsification method. As for such polymerized toner particles, for example, a colored dispersion prepared by dispersing a coloring agent in water by using a surfactant is mixed with a polymerizable monomer, a surfactant and a polymerization initiator in an aqueous medium under stirring, the polymerizable monomers are emulsified and dispersed in an aqueous medium, polymerization is performed under stirring and mixing, and then, the polymer particles are salted out by adding a salting-out agent. The particles obtained by the salting-out are filtrated, washed and dried, to thereby obtain the polymerized toner particles. Thereafter, an external additive such as silica powder and titania is added to the dried toner particles as required.

Furthermore, when producing the polymerized toner particles, a fixing property improving agent and a charge controlling agent can be blended in addition to the polymerizable monomer, surfactant, polymerization initiator, and coloring agent such that various properties of the obtained polymerized toner particles can be controlled and improved. Furthermore, in order to improve the dispersibility of the polymerizable monomer in the aqueous medium and to adjust the molecular weight of the obtained polymer, a chain transfer agent can be used.

The polymerizable monomer used for producing the polymerized toner particles is not particularly limited. Examples thereof include styrene and its derivatives; ethylenically unsaturated monoolefins such as ethylene and propylene; halogenated vinyls such as vinyl chloride, vinyl esters such as vinyl acetate; α-methylene aliphatic monocarboxylic acid esters such as methyl acrylate, ethyl acrylate, methyl methacrylate, ethyl methacrylate, 2-ethylhexyl methacrylate, dimethylamino acrylate ester, and diethylamino methacrylate ester.

Conventionally known dyes and pigments can be used as the coloring agent (coloring material) used in preparing the polymerized toner particles. For example, carbon black, phthalocyanine blue, permanent red, chrome yellow, phthalocyanine green, and the like can be used. The surface of the coloring agent may have been modified with a silane coupling agent, a titanate coupling agent or the like.

An anionic surfactant, a cationic surfactant, an amphoteric surfactant, and a nonionic surfactant can be used as the surfactant used for producing the polymerized toner particles.

Examples of the anionic surfactant include aliphatic acid salts such as sodium oleate and castor oil, alkyl sulfate esters such as sodium lauryl sulfate and ammonium lauryl sulfate, alkyl benzene sulfonates such as sodium dodecyl benzene sulfonate, alkyl naphthalene sulfonate salts, alkylphosphorate ester salts, naphthalenesulfonate formaldehyde condensate, polyoxyethylene alkylsulfurate ester salts, and the like. Examples of the nonionic surfactant include polyoxyethylene alkyl ether, polyoxyethylene aliphatic acid ester, sorbitan aliphatic acid ester, polyoxyethylene alkylamine, glycerin, aliphatic acid ester, oxyethylene-oxypropylene block polymer, and the like. Furthermore, examples of the cationic surfactant include alkylamine salts such as laurylamine acetate, quaternary ammonium salts such as lauryltrimethylammonium chloride and stearyltrimethylammonium chloride, and the like. Examples of the amphoteric surfactants include aminocarboxylic acid salts, alkyl amino acids, and the like.

The surfactant as described above can usually be used in an amount within the range of from 0.01 to 10% by weight based on the polymerizable monomer. The use amount of such a surfactant affects the dispersion stability of monomers and also affects the environmental dependency of the obtained polymerized toner particles, and thus it is preferable to use in an amount within the above-described range in which the dispersion stability of monomers is secured and the environment dependency of the polymerized toner particles is hardly affected excessively.

In the production of the polymerized toner particles, a polymerization initiator is usually used. The polymerization initiator includes a water-soluble polymerization initiator and an oil-soluble polymerization initiator, and any of them may be used in the present invention. Examples of the water-soluble polymerization initiator that can be used in the present invention include persulfates such as potassium persulfate and ammonium persulfate, and water-soluble peroxide compounds. Examples of the oil-soluble polymerization initiator include azo compounds such as azobisisobutyronitrile and oil-soluble peroxide compounds.

In the case where a chain transfer agent is used in the present invention, examples of the chain transfer agent include mercaptans such as octyl mercaptan, dodecyl mercaptan and tert-dodecyl mercaptan, carbon tetrabromide, and the like.

Furthermore, in the case where the polymerized toner particles used in the present invention contain a fixing property improver, natural wax such as carnauba wax, and olefinic wax such as polypropylene and polyethylene, and the like can be used as the fixing property improver.

In addition, in the case where the polymerized toner particles used in the present invention contain a charge control agent, there is no particular limitation on the charge control agent to be used, and a nigrosine dye, a quaternary ammonium salt, an organometallic complex, a metal-containing monoazo dye, and the like can be used.

Furthermore, example of the external additives used for improving fluidity of the polymerized toner particles and the like include silica, titanium oxide, barium titanate, fluororesin fine particles, acrylic resin fine particles, and the like, and they may be used alone or in combination.

In addition, as the salting-out agent used for separating polymerized particles from an aqueous medium, metal salts such as magnesium sulfate, aluminum sulfate, barium chloride, magnesium chloride, calcium chloride, and sodium chloride can be mentioned.

The average particle diameter of the toner particles produced as described above is in the range of from 2 to 15 μm, and preferably from 3 to 10 μm, and the polymerized toner particles have higher particle uniformity than the pulverized toner particles. By setting the average particle diameter to 2 μm or more, the charging ability is improved, and fogging and toner scattering are further suppressed. By setting to 15 μm or less, the image quality is further improved.

An electrophotographic developer can be obtained by mixing the carrier and toner produced as described above. The mixing ratio of the carrier and the toner, that is, the toner concentration is preferably set to 3 to 15% by weight in the electrophotographic developer. By setting the toner concentration to 3% by weight or more, a desired image density can be easily obtained. By setting to 15% by weight or less, toner scattering and fogging are further suppressed.

A developer obtained by mixing the carrier and toner produced as described above may be used as a replenishment developer. In this case, regarding the mixing ratio of the carrier and the toner, the toner is mixed at a ratio of 2 to 50 parts by weight with respect to 1 part by weight of the carrier.

The developer according to the present invention prepared as described above can be used in a copying machine, a printer, a FAX machine, a printing machine, and the like, which use a digital system employing a development system in which an electrostatic latent image formed on a latent image holder having an organic photoconductive layer is reversely developed with a magnetic brush of a two-component developer containing a toner and a carrier while applying a bias electric field. Furthermore, the developer is also applicable to a full-color machine and the like using an alternative electric field, which is a method in which when applying a development bias from a magnetic brush to an electrostatic latent image side, an AC bias is superimposed on a DC bias.

EXAMPLE

The present invention will be described more specifically with reference to the examples below.

Example 1

(1) Preparation of Magnetic Core Material (Carrier Core Material)

The raw materials were weighed so as to be 39.6 mol % of MnO, 9.6 mol % of MgO, 50 mol % of $Fe_2O_3$, and 0.8 mol % of SrO, and pulverized and mixed for 5 hours with a dry media mill (vibration mill, ⅛ inch diameter stainless steel beads), and the obtained pulverized product was made into pellets of about 1 mm square by a roller compactor. Used were 34.2 kg of $Fe_2O_3$ as a raw material, 12.9 kg of trimanganese tetraoxide as a MnO raw material, 2.4 kg of magnesium hydroxide as a MgO raw material, and 0.5 kg of strontium carbonate as a SrO raw material, respectively.

(1-1) Pulverization of Calcined Product

Coarse powder was removed from this pellet by using a vibration screen with an opening of 3 mm, then fine powder was removed by using a vibration screen with an opening of 0.5 mm and then, calcining was carried out by heating in a continuous electric furnace at 1,200° C. for 3 hours. Next, after pulverizing to an average particle diameter of about 5 μm by using a dry media mill (vibration mill, ⅛ inch diameter stainless steel beads) over 6 hours, water was added thereto, and further pulverization was carried out by using a wet media mill (horizontal bead mill, 1 mm diameter zirconia beads) for 4 hours.

The resulting slurry was squeezed and dehydrated by a filter press machine, water was added to the cake, and pulverization was carried out by using the wet media mill (horizontal bead mill, 1 mm diameter zirconia beads) again for 4 hours to obtain Slurry 1. The particle size (volume average particle diameter of the pulverized material) of the particles in Slurry 1 was measured by Microtrack, and $D_{50}$ thereof was found about 2 μm.

(1-2) Granulation

To Slurry 1 obtained was added PVA (aqueous 10% by weight solution) as a binder in an amount of 0.4% by weight based on the solid content, a polycarboxylic acid dispersant was added so as to attain a slurry viscosity of 2 poise, the granulation and drying were carried out by using a spray drier, and the particle size control of the obtained particles (granulated material) was performed by a gyro shifter. Thereafter, the granulated product was heated at 750° C. for 2 hours by using a rotary electric furnace in the air atmosphere to remove organic components such as the dispersant and the binder.

(1-3) Sintering

Thereafter, the granulated product was held in a tunnel electric furnace at a sintering temperature of 1,190° C. and an oxygen concentration of 0.7% by volume for 5 hours to obtain a sintered product. At this time, the temperature rising rate was set to 150° C./h and the cooling rate was set to 110° C./h. Also, nitrogen gas was introduced from an outlet side of the tunnel electric furnace, and the internal pressure of the tunnel electric furnace was set to from 0 to 10 Pa (positive pressure). Thereafter, the sintered product was disaggregated with a hammer crusher, further classified with a gyro shifter and a turbo classifier to adjust the particle size, and subjected to magnetic separation to separate a low magnetic force product, thereby obtaining ferrite particles (magnetic core material).

(2) Preparation of Carrier

A condensation-crosslinking silicone resin (weight average molecular weight: about 8,000) having a T unit and a D unit as the main components was prepared. By using a universal mixing agitator, 2.5 parts by weight of this silicone resin solution (0.5 parts by weight as a solid content because of its resin solution concentration being 20%, diluent solvent: toluene) and 100 parts by weight of the ferrite particles (magnetic core material) obtained in (1-3) were mixed and stirred, to thereby coat the surface of the ferrite particles with the silicone resin while volatilizing toluene. After confirming that the toluene was thoroughly volatilized, the residue was taken out from the apparatus, placed in a vessel, and subjected to a heat treatment at 220° C. for 2 hours in a hot air heating oven. Thereafter, the product was cooled to room temperature, ferrite particles with the resin cured were taken out, the aggregated particles were disaggregated through a vibration screen having an opening size of 200 mesh, and non-magnetic substances were removed by using a magnetic separator. Thereafter, coarse particles were again removed by the vibration screen having an opening size of 200 mesh, to obtain a ferrite carrier coated with resin.

(3) Evaluation

As to the magnetic core material and carrier obtained, evaluations of various characteristics were made in the manner described below.

<Volume Average Particle Size>

The volume average particle size ($D_{50}$) of the magnetic core material was measured by using a micro-track particle size analyzer (Model 9320-X100, produced by Nikkiso Co., Ltd.). Water was used as a dispersion medium. First, 10 g of a sample and 80 ml of water were put into a 100-ml beaker and a few drops of a dispersant (sodium hexametaphosphate) was added thereto. Subsequently, the mixture was dispersed for 20 seconds by using an ultrasonic homogenizer (UH-150 Model, produced by SMT. Co., Ltd.) at an output power level set at 4. Thereafter, foams formed on a surface of the beaker were removed, and the sample was loaded in the analyzer to perform the measurement.

<Apparent Density>

The apparent density (AD) of the magnetic core material was measured in accordance with JIS Z2504 (Test Method for Apparent Density of Metal Powders).

<Pore Volume>

The pore volume of the magnetic core material was measured by using mercury porosimeters (Pascal 140 and Pascal 240, produced by Thermo Fisher Scientific Inc.). A dilatometer CD3P (for powder) was used, and a sample was put in a commercially available gelatin capsule with a plurality of bored holes and the capsule was placed in the dilatometer. After deaeration in Pascal 140, mercury was charged, and a measurement in the low pressure region (0 to 400 kPa) was performed. Next, a measurement in the high pressure region (from 0.1 MPa to 200 MPa) was performed by Pascal 240. After the measurements, the pore volume of the ferrite particle was determined from data (the pressure and the mercury intrusion amount) for pore diameter of 3 μm or less converted from pressure. For determining the pore diameter, a control-cum-analysis software (PASCAL 140/240/440) associated with the porosimeter was used, and the calculation was carried out with the surface tension of mercury set at 480 dyn/cm and the contact angle set at 141.3°.

<BET Specific Surface Area>

The BET specific surface area of the magnetic core material was measured by using a BET specific surface area measuring apparatus (Macsorb HM model 1210, produced by Mauntec Corporation). A measurement sample was placed in a vacuum dryer, treated at 200° C. for 2 hours, held in the dryer until the temperature reached 80° C. or lower, and then taken out of the dryer. Thereafter, the sample was filled densely in a cell and set in the apparatus. The pre-treatment was carried out at a degassing temperature of 200° C. for 60 minutes and then measurement was carried out.

<Ion Content>

The measurement of the content of cation components in the magnetic core material was performed in the following manner. First, to 1 g of ferrite particle (magnetic core material) was added 10 ml of ultrapure water (Direct-Q UV3, produced by Merck), and ultrasonic wave was irradiated for 30 minutes to extract the ion components. Next, the supernatant of the extract obtained was filtered with a disposable disc filter (W-25-5, pore size: 0.45 μm, produced by Tosoh Corp.) for a pre-treatment, to form a measurement sample. Then, the cation components included in the measurement sample were quantitatively analyzed by ion chromatography under the conditions described below and converted to the content ratio in the ferrite particle.

Analysis equipment: IC-2010, produced by Tosoh Corp.
Column: TSKgel SuperIC-Cation HSII (4.6 mm I.D.×1 cm+4.6 mm I.D.×10 cm)
Eluent: Solution prepared by dissolving 3.0 mmol of methanesulfonic acid and 2.7 mmol of 18-crown 6-ether in 1 L of pure water
Flow rate: 1.0 ml/min
Column temperature: 40° C.
Injection volume: 30 μL
Measurement mode: Non-suppressor system
Detector: CM detector
Standard sample: Cation mixed standard solution produced by Kanto Chemical Co., Inc.

On the other hand, the measurement of the anion contents was performed by quantitative analysis of the anion components included in the ferrite particles with a combustion ion chromatography under the conditions described below.

Combustion equipment: AQF-2100H, produced by Mitsubishi Chemical Analytic Tech Co., Ltd.)
Sample amount: 50 mg
Combustion temperature: 1,100° C.
Combustion time: 10 minutes
Ar flow rate: 400 ml/min
$O_2$ flow rate: 200 ml/min
Humidified air flow rate: 100 ml/min
Absorption solution: Solution prepared by adding 1% by weight of hydrogen peroxide to the eluent described below
Analysis equipment: IC-2010, produced by Tosoh Corp.
Column: TSKgel SuperIC-Anion HS (4.6 mm I.D.×1 cm+4.6 mm I.D.×10 cm)
Eluent: Aqueous solution prepared by dissolving 3.8 mmol of $NaHCO_3$ and 3.0 mmol of $Na_2CO_3$ in 1 L of pure water
Flow rate: 1.5 mL/min
Column temperature: 40° C.
Injection volume: 30 μL
Measurement mode: Suppressor system
Detector: CM detector
Standard sample: Anion mixed standard solution produced by Kanto Chemical Co., Inc.

<Charge Amount and Rising-Up Speed Thereof>

The measurement of the charge amount (Q) of the magnetic core material and carrier and the rising-up speed (RQ) thereof were performed in the following manner. First, a sample and a commercially available negatively chargeable toner (cyan toner for DocuPrint C3530, produced by Fuji Xerox Co., Ltd.) used in full-color printer were weighed so as to attain the toner concentration of 8.0% by weight and the total weight of 50 g. The sample and toner weighed were exposed under the normal temperature and normal humidity environment of temperature from 20 to 25° C. and humidity from 50 to 60% for 12 hours or more. Then, the sample and toner were charged into a 50-cc glass bottle and agitated at a rotation frequency of 100 rpm for 30 minutes to form a developer. On the other hand, as a charge amount measuring apparatus, use was made of an apparatus having a magnet roll including a total of 8 poles of magnets (magnetic flux density: 0.1 T) which N poles and S poles were alternately arranged on an inner side of an aluminum bare tube (hereinafter, a sleeve) of a cylindrical shape of 31 mm in diameter and 76 mm in length, and a cylindrical electrode arranged in an outer circumference of the sleeve with a gap of 5.0 mm from the sleeve. On the sleeve was uniformly adhered 0.5 g of the developer and then, while the magnet roll on the inner side was rotated at 100 rpm with the outer-side aluminum bare tube being fixed, a direct current voltage of 2,000 V was applied for 60 seconds between the outer electrode and the sleeve to transfer the toner to the outer-side electrode. At this time, an electrometer (an insulation resistance tester, Model 6517A, produced by Keithley Instruments, Inc.) was connected to the cylindrical electrode to measure the charge amount of the toner transferred. After the elapse of 60 seconds, the voltage applied was shut off, and after the rotation of the magnet roll was stopped, the outer-side electrode was taken out and the weight of the toner transferred to the electrode was measured. From the charge amount measured and the weight of the toner transferred, the charge amount ($Q_{30}$) was calculated. In addition, the charge amount ($Q_2$) was obtained in the same procedure except for changing the agitation time of the sample and the toner to 2 minutes. The rising-up speed of charge amount (RQ) was determined from the formula shown below.

$$RQ=Q_2/Q_{30} \quad \text{[Math. 3]}$$

<Compression Breaking Strength>

The average compression breaking strength ($CS_{ave}$) and the compression breaking strength variation coefficient ($CS_{var}$) of the magnetic core material were determined as follows. First, an ultra-small indentation hardness tester (ENT-1100a, produced by Elionix Co., Ltd.) was used for measuring the compression breaking strength. A sample dispersed on a glass plate was set in the tester and subjected to measurement under an environment of 25° C. For the test, a flat indenter with a diameter of 50 μmφ was used and loaded up to 490 mN at a load speed of 49 mN/s. As a particle to be used for the measurement, a particle which was singly present on the measurement screen (lateral 130 μm×length 100 μm) of the ultra-micro indentation hardness tester, had a spherical shape, and of which an average value of a major axis and a minor axis when measured by software attached to ENT-1100a was volume average particle diameter ±2 μm was selected. It was presumed that the particle had broken down when the slope of the load-displacement curve approached 0, and the load at the inflection point was taken as the compression breaking strength. The compression breaking strengths of 100 particles were measured and the compression breaking strengths of 80 pieces excluding those of 10 particles from each of the maximum value and the minimum value were employed as data to obtain the average compression breaking strength ($CS_{ave}$). Furthermore, the compression breaking strength variation coefficient ($CS_{var}$) was calculated from the following formula by calculating the standard deviation ($CS_{sd}$) for the 80 particles above.

$$CS_{var}(\%)=(CS_{sd}/CS_{ave})\times 100 \quad \text{[Math. 4]}$$

Example 2

The preparation of magnetic core material and carrier and the evaluations were carried out in the same manner as in Example 1 except that the condition at the time of pulverizing the calcined product was changed. Here, the (1-1) pulverization of calcined product of Example 1 was changed as follows. That is, after pulverizing to an average particle diameter of about 5 μm over 6 hours by using a dry media mill (vibration mill, ⅛ inch diameter stainless steel beads), water was added to the obtained product, and further pulverization was carried out by using a wet media mill (horizontal bead mill, 1 mm diameter zirconia beads) for 4 hours. The resulting slurry was dehydrated by a vacuum filter, water was added to the cake, and pulverization was carried out by using the wet media mill (horizontal bead mill, 1 mm diameter zirconia beads) again for 4 hours to obtain Slurry 2. The particle size (volume average particle diameter of the pulverized material) of the particles contained in Slurry 2 was measured by Microtrack, and $D_{50}$ thereof was found about 2 μm.

Example 3

The preparation of magnetic core material and carrier and the evaluations were carried out in the same manner as in Example 1 except that the condition at the time of pulverizing the calcined product was changed. Here, the (1-1) pulverization of calcined product of Example 1 was changed as follows. That is, after pulverizing to an average particle diameter of about 5 μm over 6 hours by using a dry media mill (vibration mill, ⅛ inch diameter stainless steel beads), water was added to the obtained product, and further pulverization was carried out by using a wet media mill (horizontal bead mill, 1 mm diameter zirconia beads) for 4 hours. The resulting slurry was dehydrated by a centrifugal dehydrator, water was added to the cake, and pulverization was carried out by using the wet media mill (horizontal bead mill, 1 mm diameter zirconia beads) again for 4 hours to obtain Slurry 3. The particle size (volume average particle diameter of the pulverized material) of the particles contained in Slurry 3 was measured by Microtrack, and $D_{50}$ thereof was found about 2 μm.

Example 4

The preparation of magnetic core material and carrier and the evaluations were performed in the same manner as in Example 1, except for using a raw material of a different lot as the $Fe_2O_3$ raw material.

Example 5

The preparation of magnetic core material and carrier and the evaluations were carried out in the same manner as in Example 1 except that the condition at the time of pulverizing the calcined product was changed. Here, the (1-1) pulverization of calcined product of Example 1 was changed as follows. That is, after pulverizing to an average particle diameter of about 5 μm over 6 hours by using a dry media mill (vibration mill, ⅛ inch diameter stainless steel beads), water was added to the obtained product, and further pulverization was carried out by using a wet media mill (horizontal bead mill, 1 mm diameter zirconia beads) for 6 hours, to thereby obtain Slurry 5. The particle size (volume average particle diameter of the pulverized material) of the particles contained in Slurry 5 was measured by Microtrack, and $D_{50}$ thereof was found about 2 μm.

Example 6

The preparation of magnetic core material and carrier and the evaluations were performed in the same manner as in Example 5, except for using a raw material of a different lot as the $Fe_2O_3$ raw material.

Example 7

The preparation of magnetic core material and carrier and the evaluations were carried out in the same manner as in Example 1 except that the condition at the time of pulverizing the calcined product was changed. Here, the (1-1) pulverization of calcined product of Example 1 was changed as follows. That is, after pulverizing to an average particle diameter of about 5 μm over 6 hours by using a dry media mill (vibration mill, ⅛ inch diameter stainless steel beads), water was added to the obtained product, and further pulverization was carried out by using a wet media mill (horizontal bead mill, 1 mm diameter zirconia beads) for 3 hours. The resulting slurry was squeezed and dehydrated with a filter press, water was added to the cake, and again pulverized for 2 hours by using the wet media mill (horizontal bead mill, 1 mm diameter zirconia beads). The obtained slurry was again squeezed and dehydrated with the filter press, water was added to the cake, and further pulverization was carried out by using the wet media mill (horizontal bead mill, 1 mm diameter zirconia beads) for 3 hours to obtain Slurry 7. The particle size (volume average particle diameter of the pulverized material) of the particles contained in Slurry 7 was measured by Microtrack, and $D_{50}$ was found about 2 μm.

Example 8

The preparation of magnetic core material and carrier and the evaluations were carried out in the same manner as in Example 1 except that the sintering condition (sintering temperature) in the preparation of the core material was changed. That is, the (1-3) sintering was carried out in a tunnel electric furnace at a sintering temperature of 1,290° C. and an oxygen concentration of 0.7% by volume and held for 5 hours to obtain a sintered product.

Example 9

The preparation of magnetic core material and carrier and the evaluations were carried out in the same manner as in Example 1 except that the sintering condition (sintering temperature) in the preparation of the core material was changed. That is, the (1-3) sintering was carried out in a tunnel electric furnace at a sintering temperature of 1,120° C. and an oxygen concentration of 0.7% by volume and held for 5 hours to obtain a sintered product.

Results

In Examples 1 to 9, the evaluation results obtained were as shown in Tables 1 and 2. In Examples 1 to 4, which are Inventive Examples, the magnetic core materials had excellent charge amounts ($Q_2$, $Q_{30}$) and compression breaking strength ($CS_{ave}$), and had large rising-up speed of charge amount (RQ) and small variation coefficient of compression breaking strength ($CS_{var}$). Furthermore, the carriers also had excellent charge amounts ($Q_2$, $Q_{30}$) and large rising-up speed of charge amount (RQ). In Examples 5 and 6, which are Comparative Examples, the magnetic core materials had an excessively high content of the sulfur component ($SO_4^{2-}$), and as a result, the rising-up speed of charge amount (RQ) was not sufficient. On the other hand, in Example 7, which is Comparative Example, the magnetic core material was an excessively low content of the sulfur component ($SO_4^{2-}$), and as a result, the variation coefficient of the compression breaking strength ($CS_{var}$) increased. In Example 8, which is Comparative Example, the absolute value of the charge amount was low because of the small BET specific surface area, and in Example 9, the compression breaking strength became small because of the large BET specific surface area. From these results, it has been found that a magnetic core material for electrophotographic developer and a carrier for electrophotographic developer, which are excellent in rising-up of charge amount, have high compression breaking strength and small variation thereof, and with which a satisfactory image free from defects can be obtained, and a developer containing the carrier can be obtained according to the present invention.

TABLE 1

| | $D_{50}$ | AD | Pore volume | BET specific surface area | Ion content (ppm) | | | | | | | | | | |
|---|---|---|---|---|---|---|---|---|---|---|---|---|---|---|---|
| | (μm) | (g/cm$^3$) | (mm$^3$/g) | (m$^2$/g) | $F^-$ | $Cl^-$ | $Br^-$ | $NO_2^-$ | $NO_3^-$ | $SO_4^{2-}$ | $Na^+$ | $NH_4^+$ | $Mg^{2+}$ | $Ca^{2+}$ | $K^+$ |
| Ex. 1 | 38.8 | 2.18 | 13 | 0.13 | 5.6 | 21.8 | N.D. | 0.1 | 0.3 | 117 | 9.0 | N.D. | 2.3 | 17.7 | 4.4 |
| Ex. 2 | 38.2 | 2.20 | 11 | 0.15 | 6.4 | 22.6 | N.D. | 0.3 | 0.6 | 289 | 7.6 | N.D. | 3.0 | 19.8 | 4.8 |
| Ex. 3 | 38.6 | 2.17 | 12 | 0.15 | 6.3 | 22.2 | N.D. | 0.1 | 0.2 | 419 | 8.8 | N.D. | 1.9 | 17.9 | 3.9 |
| Ex. 4 | 38.2 | 2.22 | 14 | 0.16 | 3.3 | 30.6 | N.D. | 0.4 | 0.5 | 192 | 13.1 | N.D. | 2.5 | 31.0 | 3.9 |
| Ex. 5* | 38.0 | 2.25 | 15 | 0.17 | 5.9 | 34.0 | N.D. | 0.1 | 0.3 | 821 | 15.6 | N.D. | 2.8 | 28.6 | 5.5 |
| Ex. 6* | 38.8 | 2.21 | 13 | 0.14 | 4.3 | 19.7 | N.D. | 0.7 | 0.5 | 1564 | 7.9 | N.D. | 2.7 | 19.6 | 4.8 |
| Ex. 7* | 38.4 | 2.19 | 12 | 0.14 | 4.1 | 13.7 | N.D. | 0.1 | 0.2 | 47 | 7.2 | N.D. | 1.6 | 13.3 | 4.1 |
| Ex. 8* | 38.9 | 2.34 | 6 | 0.05 | 5.3 | 19.8 | N.D. | 0.1 | 0.1 | 88 | 8.1 | N.D. | 2.3 | 18.1 | 3.9 |
| Ex. 9* | 38.7 | 2.02 | 38 | 0.30 | 5.8 | 22.7 | N.D. | 0.2 | 0.4 | 147 | 9.6 | N.D. | 2.4 | 17.9 | 4.5 |

*indicates Comparative Example.
N.D. stands for "non-detected"

TABLE 2

| | Charge amount of core material | | | Charge amount of carrier | | | Compression breaking strength of core material | |
|---|---|---|---|---|---|---|---|---|
| | $Q_2$ | $Q_{30}$ | | $Q_2$ | $Q_{30}$ | | | |
| | (μC/g) | (μC/g) | RQ | (μC/g) | (μC/g) | RQ | $CS_{ave}$ (mN) | $CS_{var}$ (%) |
| Ex. 1 | 48.4 | 50.4 | 0.96 | 43.2 | 45.1 | 0.96 | 296 | 28 |
| Ex. 2 | 43.1 | 46.2 | 0.93 | 38.7 | 41.6 | 0.93 | 290 | 24 |
| Ex. 3 | 39.7 | 46.3 | 0.86 | 36.7 | 41.3 | 0.89 | 289 | 24 |
| Ex. 4 | 38.8 | 43.7 | 0.89 | 35.4 | 38.9 | 0.91 | 287 | 31 |
| Ex. 5* | 29.8 | 39.6 | 0.75 | 26.1 | 35.5 | 0.74 | 286 | 20 |
| Ex. 6* | 20.8 | 29.8 | 0.70 | 18.6 | 27.0 | 0.69 | 294 | 19 |
| Ex. 7* | 49.2 | 50.8 | 0.97 | 44.0 | 44.9 | 0.98 | 297 | 44 |
| Ex. 8* | 27.7 | 29.3 | 0.95 | 25.8 | 27.6 | 0.93 | 337 | 20 |
| Ex. 9* | 41.7 | 45.8 | 0.91 | 39.4 | 44.5 | 0.89 | 196 | 22 |

*indicates Comparative Example.

INDUSTRIAL APPLICABILITY

According to the present invention, a magnetic core material for electrophotographic developer which is excellent in rising-up of charge amount, has high compression breaking strength and small variation thereof and with which a satisfactory image can be stably obtained in the case of being used for a carrier, the carrier for electrophotographic developer, and a developer containing the carrier can be provided.

While the present invention has been described in detail with reference to specific embodiments, it will be apparent to those skilled in the art that various changes and modifications can be made without departing from the spirit and scope of the invention.

This application is based on Japanese Patent Application (No. 2017-000285) filed on Jan. 4, 2017, the contents of which are incorporated herein by reference.

The invention claimed is:

1. A magnetic core material for electrophotographic developer, having a sulfur component content of from 50 to 700 ppm in terms of a sulfite ion and a BET specific surface area of from 0.06 to 0.25 m$^2$/g, wherein the sulfur component content is from 80 to 500 ppm in terms of a sulfate ion.

2. The magnetic core material for electrophotographic developer according to claim 1, wherein the magnetic core material has a ferrite composition comprising Fe, Mn, Mg, and Sr.

3. The magnetic core material for electrophotographic developer according to claim 1, wherein the BET specific surface area of from 0.08 to 0.22 m$^2$/g.

4. A carrier for electrophotographic developer comprising the magnetic core material for electrophotographic developer as described in claim 1 and a coating layer comprising a resin provided on a surface of the magnetic core material.

5. A developer comprising the carrier as described in claim 4 and a toner.

* * * * *